US012375017B2

(12) United States Patent
Natsume et al.

(10) Patent No.: US 12,375,017 B2
(45) Date of Patent: Jul. 29, 2025

(54) MOTOR CONTROL DEVICE, AND MOTOR CONTROL METHOD

(71) Applicant: JTEKT CORPORATION, Kariya (JP)

(72) Inventors: Yusuke Natsume, Okazaki (JP);
Shigetoshi Yamaguchi, Okazaki (JP);
Kota Sei, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 110 days.

(21) Appl. No.: 18/286,236

(22) PCT Filed: Mar. 29, 2022

(86) PCT No.: PCT/JP2022/015406
§ 371 (c)(1),
(2) Date: Oct. 10, 2023

(87) PCT Pub. No.: WO2022/224736
PCT Pub. Date: Oct. 27, 2022

(65) Prior Publication Data
US 2024/0372493 A1 Nov. 7, 2024

(30) Foreign Application Priority Data
Apr. 21, 2021 (JP) ................. 2021-071707

(51) Int. Cl.
*H02P 21/05* (2006.01)
*B62D 5/00* (2006.01)
*H02P 21/22* (2016.01)

(52) U.S. Cl.
CPC .............. *H02P 21/05* (2013.01); *H02P 21/22* (2016.02); *B62D 5/006* (2013.01)

(58) Field of Classification Search
CPC . H02P 21/05; H02P 21/22; H02P 6/10; B62D 5/006; B62D 5/046
(Continued)

(56) References Cited

U.S. PATENT DOCUMENTS

| 9,136,785 | B2 * | 9/2015 | Gebregergis ............ H02P 21/05 |
| 2015/0326163 | A1 | 11/2015 | Yamaguchi et al. |
| 2021/0044234 | A1 | 2/2021 | Endo et al. |

FOREIGN PATENT DOCUMENTS

| JP | 2000-232796 A | 8/2000 |
| JP | 2005-102434 A | 4/2005 |

(Continued)

OTHER PUBLICATIONS

Jun. 7, 2022 International Search Report issued in International Patent Application No. PCT/JP2022/015406.

(Continued)

*Primary Examiner* — David Luo
(74) *Attorney, Agent, or Firm* — Oliff PLC (57) ABSTRACT

A control device calculates a voltage command value for an inverter by executing feedback control that causes a current value of a three-phase motor to follow a current command value for the motor. The control device includes a compensation calculator that calculates, using a rotation angle of the motor, a correction voltage added to the voltage command value to compensate for torque ripple of the motor. The correction voltage is a sine wave that is in antiphase with the torque ripple, and is obtained by adding together a real part, a cosine wave component, and an imaginary part, a sine wave component that have the same frequency. The compensation calculator is configured to calculate amplitudes of the cosine wave component and the sine wave component from the current command value and a rotation speed of the motor.

6 Claims, 3 Drawing Sheets

(58) Field of Classification Search
USPC .................................................. 318/400.02
See application file for complete search history.

(56) References Cited

FOREIGN PATENT DOCUMENTS

| JP | 2009-292413 A | 12/2009 |
|---|---|---|
| WO | 2014/088054 A1 | 6/2014 |
| WO | 2016/067665 A1 | 5/2016 |
| WO | 2019/163552 A1 | 8/2019 |

OTHER PUBLICATIONS

Schramm et al., "Compensation of Torque Ripples in Permanent Magnet Synchronous Machines up to the Field Weakening Range," 2017 7th International Electric Drives Production Conference, Dec. 5, 2017, pp. 1-8.
Sep. 17, 2024 Extended Search Report issued in European Patent Application No. 22791511.3.

* cited by examiner

MOTOR CONTROL DEVICE, AND MOTOR CONTROL METHOD

TECHNICAL FIELD

The present disclosure relates to a motor control device and a motor control method.

BACKGROUND ART

A conventional control device executes current feedback control that causes the value of an actual current supplied to a motor to follow a current command value. The motor is, for example, a three-phase brushless motor. The control device converts the detected values of three-phase currents supplied to the motor into those of two-phase currents in a dq-axis coordinate system, and performs current feedback control in the dq-axis coordinate system. Since the dq-axis coordinate system is a rotation coordinate system, the control device performs current vector control by dividing the currents into a torque component and a field-weakening component.

Torque ripple, which is torque pulsation, may be generated in the motor. Torque ripple may result in vibration or noise. Thus, for example, a control device disclosed in Patent Literature 1 executes a compensation control that limits torque ripple. The control device superimposes, on a target q-axis current, a compensation current that cancels the torque ripple. The compensation current is a sine wave that is in antiphase with sixth harmonic components, which dominate the vibration components of the torque ripple.

CITATION LIST

Patent Literature

Patent Literature 1: PCT Publication No. 2019/163552

SUMMARY OF INVENTION

Technical Problem

The control device of Patent Literature 1 calculates the gain (amplitude) and phase of the compensation current using a lookup table, based on the absolute value of the target q-axis current and the absolute value of the angular velocity of the motor. The control device calculates the compensation current using the gain and phase obtained from the lookup table. Thus, while the control device needs to calculate both gain and phase, there has been a recent desire to further reduce the calculation load on the control device.

Solution to Problem

An aspect of the present disclosure provides a motor control device that calculates a voltage command value for an inverter by executing feedback control that causes a current value of a three-phase motor to follow a current command value for the motor. The inverter controls current supplied to the motor. The motor control device includes a compensation calculator configured to calculate, using a rotation angle of the motor detected by a sensor, a correction voltage added to the voltage command value to compensate for torque ripple of the motor. The correction voltage is a sine wave that is in antiphase with the torque ripple, and is obtained by adding together a real part that is a cosine wave component and an imaginary part that is a sine wave component. The cosine wave component and the sine wave component have the same frequency. The compensation calculator is configured to calculate an amplitude of the cosine wave component and an amplitude of the sine wave component from the current command value and a rotation speed of the motor.

Another aspect of the present disclosure provides a motor control method that includes calculating a voltage command value for an inverter by executing feedback control that causes a current value of a three-phase motor to follow a current command value for the motor. The inverter controls current supplied to the motor. The motor control method further includes executing a compensation calculation process that calculates, using a rotation angle of the motor detected by a sensor, a correction voltage added to the voltage command value to compensate for torque ripple of the motor. The correction voltage is a sine wave that is in antiphase with the torque ripple, and is obtained by adding together a real part that is a cosine wave component and an imaginary part that is a sine wave component. The cosine wave component and the sine wave component having the same frequency. The compensation calculation process includes a process that calculates an amplitude of the cosine wave component and an amplitude of the sine wave component from the current command value and a rotation speed of the motor.

DESCRIPTION OF EMBODIMENTS

A motor control device according to an embodiment will now be described. The motor control device is used to control an electric power steering system.

Figure 1:
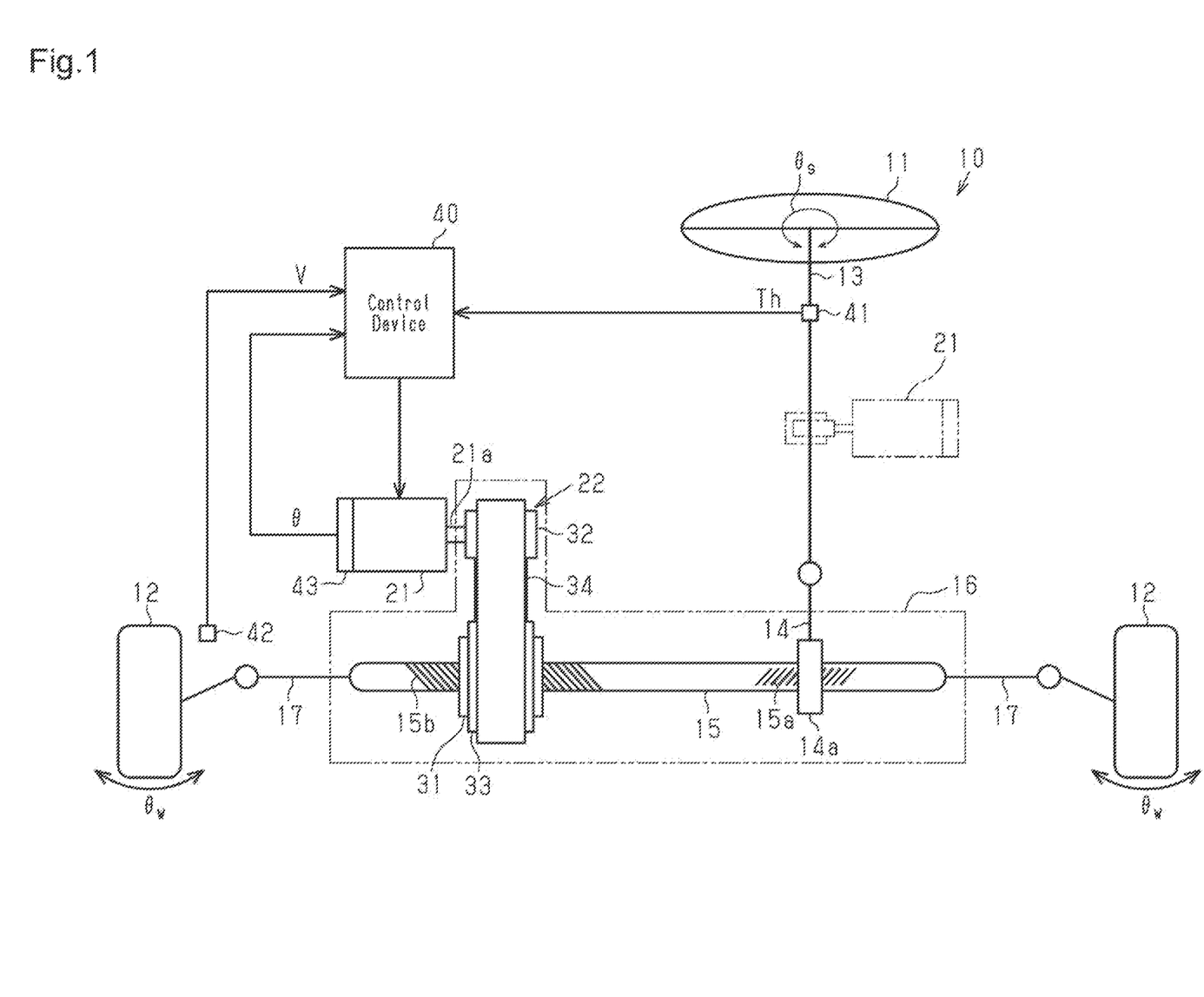
FIG. 1 is a diagram schematically showing an electric power steering system equipped with a motor control device according to an embodiment.

As shown in FIG. 1, an electric power steering system 10 includes a steering shaft 13, a pinion shaft 14, and a steerable wheel shaft 15. The steering shaft 13, the pinion shaft 14, and the steerable wheel shaft 15 form a power transmission path between the steering wheel 11 and steerable wheels 12, 12. The steerable wheel shaft 15 extends in the left-right direction in FIG. 1, which corresponds to the width direction of a vehicle body. The steerable wheel shaft 15 is accommodated in a housing 16 that is fixed to the vehicle body. The opposite ends of the steerable wheel shaft 15 are coupled to the steerable wheels 12, 12 with tie rods 17, 17, respectively. The pinion shaft 14 includes pinion teeth 14a that mesh with rack teeth 15a of the steerable wheel shaft 15. Accordingly, when the steerable wheel shaft 15 moves along its axis as the steering wheel 11 rotates, steered angles $\theta_w$, $\theta_w$ of the steerable wheels 12, 12 are changed.

Further, the electric power steering system 10 includes a motor 21 and a transmission mechanism 22. The motor 21 and the transmission mechanism 22 are each configured to apply an assist force to the steerable wheel shaft 15. The assist force refers to the driving force applied to the steering wheel 11 to assist the operation of the steering wheel 11.

The motor 21 is the source of the assist force. The motor 21 is, for example, a three-phase brushless motor. The motor 21 is fixed to the outside of the housing 16. The motor 21 includes an output shaft 21a that extends parallel to the steerable wheel shaft 15. The output shaft 21a of the motor 21 is coupled to the steerable wheel shaft 15 by a transmission mechanism 22. The torque generated by the motor 21 is applied to the steerable wheel shaft 15 by the transmission mechanism 22 as the assist force.

The transmission mechanism 22 includes a ball nut 31, a driving pulley 32, a driven pulley 33, and an endless belt 34. The ball nut 31 is fastened to a ball threaded part 15b of the steerable wheel shaft 15 by balls (not shown). The driving pulley 32 is fixed to the output shaft 21a of the motor 21. The driven pulley 33 is fitted and fixed to the outer circumferential surface of the ball nut 31. The belt 34 is looped between the driving pulley 32 and the driven pulley 33. Thus, rotation of the motor 21 is transmitted to the ball nut 31 through the driving pulley 32, the belt 34, and the driven pulley 33. As the ball nut 31 rotates, the steerable wheel shaft 15 moves along its axis.

Further, the electric power steering system 10 includes a control device 40 that controls the motor 21. The control device 40 obtains the detection results of various types of vehicle on-board sensors as information indicating the request or traveling state of a driver, and controls the motor 21 based on the obtained information. Examples of the sensors include a torque sensor 41, a vehicle speed sensor 42, and a rotation angle sensor 43. The torque sensor 41 is arranged on the steering shaft 13. The torque sensor 41 detects a steering torque Th applied to the steering shaft 13. The vehicle speed sensor 42 detects a vehicle speed V. The rotation angle sensor 43 is arranged in the motor 21. The rotation angle sensor 43 detects a rotation angle θ of the motor 21. By controlling the supply of power to the motor 21, the control device 40 executes an assist control that generates the assist force corresponding to the steering torque Th and the vehicle speed V. The control device 40 performs vector control on the motor 21 using the rotation angle θ of the motor 21, which is detected by the rotation angle sensor 43.

The control device 40 will now be described in detail.

Figure 2:
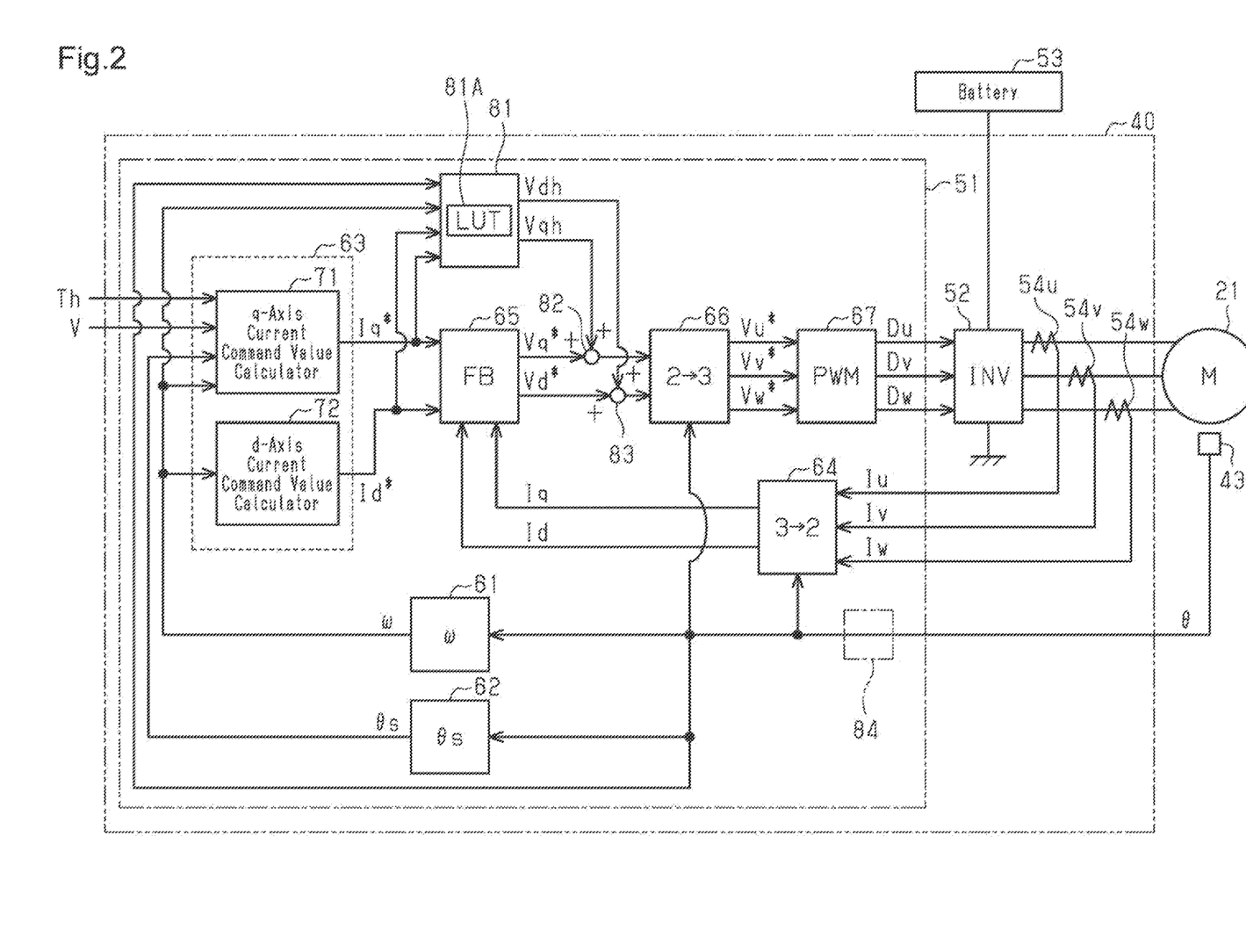
FIG. 2 is a block diagram showing the motor control device of the embodiment.

As shown in FIG. 2, the control device 40 includes a microcomputer 51 that generates a motor control signal and an inverter 52 that supplies three-phase driving power to the motor 21 based on a motor control signal generated by the microcomputer 51. The microcomputer 51 is, for example, processing circuitry that includes a CPU and a memory. The microcomputer 51 executes various processes by causing the CPU to execute programs stored in the memory. The memory includes a computer-readable medium such as a random-access memory (RAM) or a read-only memory (ROM). However, using software to implement various processes is just one example. The processing circuitry of the control device 40 may be configured to execute at least some of the processes using a hardware circuit, such as a logic circuit.

The inverter 52 is a known PWM inverter. The inverter 52 is formed by connecting three legs respectively corresponding to the three phases in parallel. Each leg includes two switching elements connected in series. Each switching element is, for example, an field-effect transistor (FET). The motor control signal generated by the microcomputer 51 defines the duty cycle of each switching element of the inverter 52. The motor control signal is applied to a gate terminal of each switching element. In response to the motor control signal, the switching elements are turned on and off so that DC voltage of a vehicle on-board battery 53 is converted into driving power of three phases (U, V, W). As a result, the converted three-phase driving power is supplied to the motor 21.

The microcomputer 51 obtains the steering torque Th, which is detected by the torque sensor 41, the vehicle speed V, which is detected by the vehicle speed sensor 42, and the rotation angle θ of the motor 21, which is detected by the rotation angle sensor 43. Further, the microcomputer 51 receives the values of three-phase currents Iu, Iv, Iw that are respectively detected by current sensors 54u, 54v, 54w on a path for suppling power to the motor 21. The microcomputer 51 controls the supply of power to the motor 21 based on the steering torque Th, the vehicle speed V, the rotation angle θ of the motor 21, and the values of the currents Iu, Iv, Iw of the motor 21, which are detected by the respective sensors. The microcomputer 51 controls the supply of power to the motor 21 to obtain a proper assist force that corresponds to the operation state of the steering wheel 11 or the traveling state of the vehicle. The microcomputer 51 controls the motor 21 through vector control that is described in a dq-axis coordinate system serving as a two-phase rotation coordinate system.

The configuration of the microcomputer 51 will now be described in detail.

As shown in FIG. 2, the microcomputer 51 includes a rotation speed calculator 61, a steering angle calculator 62, a current command value calculator 63, a three-phase-to-two-phase coordinate converter 64, a feedback controller 65, a two-phase-to-three-phase coordinate converter 66, and a control signal generator 67.

The rotation speed calculator 61 is, for example, a differentiator. The rotation speed calculator 61 calculates a rotation speed ω of the motor 21 by differentiating the rotation angle θ of the motor 21, which is detected by the rotation angle sensor 43, with respect to time.

The steering angle calculator 62 calculates a steering angle θs from the rotation angle θ of the motor 21, which is detected by the rotation angle sensor 43. The steering angle θs is the rotation angle of the steering wheel 11. For example, the steering angle calculator 62 calculates the absolute value of a rotation angle θ that exceeds 360° in multiple rotations by counting the number of the rotations of the motor 21 with reference to the neutral position of the steering wheel 11 corresponding to a straight-line traveling state of the vehicle. The steering angle calculator 62 calculates the steering angle θs by multiplying the rotation angle θ of the motor 21 in multiple rotations by a conversion coefficient that is based on the deceleration ratio between the motor 21 and the steering shaft 13.

The current command value calculator 63 includes a q-axis current command value calculator 71 and a d-axis current command value calculator 72.

The q-axis current command value calculator 71 calculates a basic assist torque from the steering torque Th, which is detected by the torque sensor 41, and the vehicle speed V, which is detected by the vehicle speed sensor 42. The q-axis current command value calculator 71 calculates a target assist torque such that its absolute value increases as the absolute value of the steering torque Th increases and the vehicle speed V decreases. Further, the q-axis current command value calculator 71 uses the rotation speed ω of the motor 21, which is calculated by the rotation speed calculator 61, and the steering angle θs, which is calculated by the steering angle calculator 62, to calculate a compensation value for the basic assist torque. The compensation value is calculated as, for example, the sum of a force of the steering shaft 13 returning to the neutral position and a return torque that corresponds to the resistance against the rotation of the steering shaft 13. The returning force increases in proportion to the steering angle θs, and the return torque increases in proportion to the rotation speed ω of the motor 21. The q-axis current command value calculator 71 sets the target assist torque to the sum of the basic assist torque and the compensation value, and calculates a q-axis current command value Iq* in the dq-axis coordinate system by dividing the target assist torque by a torque constant.

The d-axis current command value calculator 72 calculates a d-axis current command value Id* using the rotation speed ω of the motor 21, which is calculated by the rotation speed calculator 61. The d-axis current command value calculator 72 executes field-weakening control that sets the d-axis current command value Id* to a negative value based on the rotation speed ω of the motor 21. Specifically, as the rotation speed ω of the motor 21 increases, induced voltage (counter-electromotive force) produced in the motor coils of the three phases increases. Consequently, the rotation speed of the motor 21 has an upper limit (base speed). However, by setting the d-axis current command value Id* to a negative value, that is, by supplying a d-axis current in the negative direction, the magnetic flux in the d-axis direction is reduced using a demagnetization magnetomotive force produced by counter-acting on a d-axis armature, thereby reducing the induced voltage. This allows the driving range (rotation range) of the motor 21 to be extended beyond its base speed to a high-speed region.

For example, when the absolute value of the rotation speed ω is less than or equal to a first set value, which is a value relatively close to 0, the d-axis current command value calculator 72 sets the d-axis current command value Id* to 0. When the absolute value of the rotation speed ω is greater than the first set value, the d-axis current command value calculator 72 calculates a negative d-axis current command value Id*. When the absolute value of the rotation speed ω is greater than the first set value and less than or equal to a second set value, which is set to be greater than the first set value, the d-axis current command value calculator 72 calculates the d-axis current command value Id* such that the d-axis current command value Id* has a larger absolute value as the absolute value of the rotation speed ω increases. When the absolute value of the rotation speed ω is greater than the second set value, the d-axis current command value calculator 72 maintains the absolute value of the d-axis current command value Id* at an upper limit value.

The three-phase-to-two-phase coordinate converter 64 obtains the rotation angle θ of the motor 21, which is detected by the rotation angle sensor 43, and the values of currents Iu, Iv, Iw of the phases of the motor 21, which are respectively detected by the current sensors 54u, 54v, 54w. The three-phase-to-two-phase coordinate converter 64 uses the rotation angle θ of the motor 21 to convert the values of the three-phase currents Iu, Iv, Iw of the motor 21 into a q-axis current value Iq and a d-axis current value Id of two-phase currents in the dq-axis coordinate system.

The feedback controller 65 obtains the q-axis current command value Iq* and the d-axis current command value Id*, which are calculated by the current command value calculator 63. Further, the feedback controller 65 receives the q-axis current value Iq and the d-axis current value Id, which are calculated by the three-phase-to-two-phase coordinate converter 64. The feedback controller 65 calculates a q-axis current deviation, which is the value of the difference between the q-axis current command value Iq* and the q-axis current value Iq, and a d-axis current deviation, which is the value of the difference between the d-axis current command value Id* and the d-axis current value Id. The feedback controller 65 calculates a q-axis voltage command value Vq* such that the q-axis current value Iq follows the q-axis current command value Iq*. The feedback controller 65 calculates a d-axis voltage command value Vd* such that the d-axis current value Id follows the d-axis current command value Id*. The feedback controller 65 calculates the q-axis voltage command value Vq* and the d-axis voltage command value Vd* by, for example, multiplying the q-axis current deviation and the d-axis current deviation by a predetermined feedback gain.

The two-phase-to-three-phase coordinate converter 66 receives the q-axis voltage command value Vq* and the d-axis voltage command value Vd*, which are calculated by the feedback controller 65. The two-phase-to-three-phase coordinate converter 66 converts the q-axis voltage command value Vq* and the d-axis voltage command value Vd* into three-phase voltage command values Vu*, Vv*, Vw* based on the rotation angle θ of the motor 21, which is detected by the rotation angle sensor 43.

The control signal generator 67 receives the three-phase voltage command values Vu*, Vv*, Vw*, which are calculated by the two-phase-to-three-phase coordinate converter 66. The control signal generator 67 generates motor control signals (PWM control signals) Du, Dv, Dw that have duty cycles corresponding to the voltage command values Vu ", Vv*, Vw", respectively. When the switching elements of the inverter 52 are switched based on the motor control signals Du, Dv, Dw, the current corresponding to the target assist torque is supplied to the motor 21.

Further, for example, when the steering wheel 11 is rotated faster and the motor 21 is rotated at a higher speed, a negative d-axis current flows through the motor 21 as a field-weakening control current. This limits the occurrence of a counter-electromotive force (induced voltage) in the motor 21. Thus, even when the steering wheel 11 is operated at a relatively high speed, the motor 21 rotates accordingly in a favorable manner. This provides a favorable steering feel.

Compensation Control for Torque Ripple

The electric power steering system 10 may have the following problem. The motor 21 may generate torque ripple, which is torque pulsation, and the torque ripple results in vibration or noise. For example, when the number of poles of the motor 21 is eight and the number of slots is twelve, sixth harmonic components included in vibration components of the torque ripple have a greater influence. To ensure the steering feel, the electric power steering system 10 needs to reduce vibrations. To ensure quietness, the electric power steering system 10 needs to reduce operating noises. Thus, the control device 40 executes a compensation control that limits the torque ripple of the motor 21.

One example of the configuration of compensating for torque ripple is as follows. As shown in FIG. 2, the microcomputer 51 includes a compensation calculator 81 and two adders 82, 83.

The compensation calculator 81 receives the q-axis current command value Iq*, which is calculated by the q-axis current command value calculator 71, and the d-axis current command value Id*, which is calculated by the d-axis current command value calculator 72. Further, the compensation calculator 81 receives the rotation speed ω of the motor 21, which is calculated by the rotation speed calculator 61, and the rotation angle θ of the motor 21, which is detected by the rotation angle sensor 43.

Based on the q-axis current command value Iq*, the rotation speed ω of the motor 21, and the rotation angle θ of the motor 21, the compensation calculator 81 calculates a correction voltage Vqh for the q-axis current command value Iq* as a compensation value that is used to cancel the torque ripple. Further, the compensation calculator 81 uses the d-axis current command value Id*, the rotation speed ω of the motor 21, and the rotation angle θ of the motor 21 to calculate a correction voltage Vdh for the d-axis current command value Id* as a compensation value that is used to cancel the torque ripple. The correction voltage Vqh, Vdh are sine waves that are in antiphase with sixth harmonic components, which dominate the vibration components of the torque ripple.

The correction voltage Vqh is expressed by the following equation (1).

$$Vqh = Vq_{h6th} \cdot \sin(6\theta + \theta_{Vqf6th}) \qquad (1)$$

Here, $Vq_{h6th}$ represents the amplitude of the correction voltage Vqh, $\theta_{Vqf6th}$ represents the phase of the correction voltage Vqh, and θ represents the rotation angle of the motor 21 detected by the rotation angle sensor 43.

The correction voltage Vdh is expressed by the following equation (2).

$$Vdh = Vd_{h6th} \cdot \sin(6\theta + \theta_{Vdf6th}) \qquad (2)$$

Here, $Vd_{h6th}$ represents the amplitude of the correction voltage Vdh, $\theta_{Vdf6th}$ represents the phase of the correction voltage Vdh, and θ represents the rotation angle of the motor 21 detected by the rotation angle sensor 43.

The compensation calculator 81 may obtain the values of the amplitude $Vq_{h6th}$ and the phase $\theta_{Vqf6th}$ with reference to, for example, a first lookup table. The first lookup table defines the relationship between input values and reference values. The input values include the absolute value of the q-axis current command value Iq* and the absolute value of the rotation speed ω of the motor 21. The reference values include the amplitude $Vq_{h6th}$ and the phase $\theta_{Vqf6th}$. With reference to the first lookup table, in which the q-axis current command value Iq* and the rotation speed ω of the motor 21 are input values, the compensation calculator 81 obtains, as reference values, the amplitude $Vq_{h6th}$ and the phase $\theta_{Vqf6th}$, which correspond to the absolute values of the input values. The compensation calculator 81 calculates the correction voltage Vqh by applying the amplitude $Vq_{h6th}$ and the phase $\theta_{Vqf6th}$, which are obtained from the first lookup table, to the above equation (1).

The compensation calculator 81 obtains the values of the amplitude $Vd_{h6th}$ and the phase $\theta_{Vdf6th}$ with reference to a second lookup table. The second lookup table defines the relationship between input values and reference values. The input values include the absolute value of the d-axis current command value Id* and the absolute value of the rotation speed ω of the motor 21. The reference values include the amplitude $Vd_{h6th}$ and the phase $\theta_{Vdf6th}$. With reference to the second lookup table, in which the d-axis current command value Id* and the rotation speed ω of the motor 21 are input values, the compensation calculator 81 obtains, as reference values, the amplitude $Vd_{h6th}$ and the phase $\theta_{Vdf6th}$, which correspond to the absolute values of the input values. The compensation calculator 81 calculates the correction voltage Vdh by applying the amplitude $Vd_{h6th}$ and the phase $\theta_{Vdf6th}$, which are obtained from the second lookup table, to the above equation (2).

The adder 82 adds the correction voltage Vqh, which is calculated by the compensation calculator 81, to the q-axis voltage command value Vq*, which is calculated by the feedback controller 65, thereby calculating a final q-axis voltage command value Vqh* that is used to control the motor 21. The final q-axis voltage command value Vqh* is represented by the following equation (3).

$$Vqh^* = Vq^* + Vqh = Vq^* + Vq_{h6th} \cdot \sin(6\theta + \theta_{Vqf6th}) \qquad (3)$$

The adder 83 adds the correction voltage Vdh, which is calculated by the compensation calculator 81, to the d-axis voltage command value Vd*, which is calculated by the feedback controller 65, thereby calculating a final d-axis voltage command value Vdh* that is used to control the motor 21. The final d-axis voltage command value Vdh* is expressed by the following equation (4).

$$Vdh^* = Vd^* + Vdh = Vd^* + Vd_{h6th} \cdot \sin(6\theta + \theta d_{Vdf6th}) \qquad (4)$$

In this manner, the torque ripple of the motor 21 is limited by adding the correction voltage Vqh, which cancels the torque ripple, to the q-axis voltage command value Vq* for the inverter 52 and adding the correction voltage Vdh, which cancels the torque ripple, to the d-axis voltage command value Vd* for the inverter 52.

In the compensation control for the torque ripple, for example, a correction current that cancels the torque ripple may be added to each of the q-axis current command value Iq* and the d-axis current command value Id*. However, in a case in which the correction current is superimposed on the current command value, the calculation cycle needs to be set to a shorter time as the current feedback is executed to cause the current command value to follow the actual current value. This further increases the calculation load. In this regard, in a case in which the correction voltage is superimposed on the voltage command value, the calculation cycle of the microcomputer 51 is theoretically a cycle of superimposing the correction voltage on the voltage command value. Thus, the calculation load in this case is lower than the calculation load in the case in which the correction current is superimposed on the current command value. This allows the microcomputer 51 to handle a high-frequency order component and handle a high-speed rotation of the motor 21 without setting the calculation cycle to a shorter time.

In recent years, the calculation load on the microcomputer 51 needs to be further reduced. In this case, the correction voltages Vqh, Vdh may be calculated as follows.

First, the correction voltages Vqh, Vdh, which are sine waves, are each broken into a real part that is a cosine wave component and an imaginary part that is a sine wave component. In this case, the cosine wave component and the sine wave component have the same frequency.

The correction voltage Vqh is expressed by the following equation (5).

$$Vqh = \mathrm{Re}_{vq6th} \cdot \cos 6\theta + \mathrm{Im}_{vq6th} \cdot \sin 6\theta \qquad (5)$$

Here, $\text{Re}_{vq6th}$ is the amplitude of a cosine wave component of the correction voltage Vqh, $\text{Im}_{vq6th}$ represents the amplitude of a sine wave component of the correction voltage Vqh, and θ represents the rotation angle of the motor 21 detected by the rotation angle sensor 43.

The correction voltage Vdh is expressed by the following equation (6).

$$Vdh = \text{Re}_{vd6th} \cdot \cos 6\theta + \text{Im}_{vd6th} \cdot \sin 6\theta \qquad (6)$$

Here, $\text{Re}_{vd6th}$ represents the amplitude of a cosine wave component of the correction voltage Vdh, $\text{Im}_{vd6th}$ is the amplitude of a sine wave component of the correction voltage Vdh, and θ represents the rotation angle of the motor 21 detected by the rotation angle sensor 43.

The compensation calculator 81 uses a lookup table (LUT) 81A to obtain the amplitude $\text{Re}_{vq6th}$ of the cosine wave component and the amplitude $\text{Im}_{vq6th}$ of the sine wave component for the correction voltage Vqh and the amplitude $\text{Re}_{vd6th}$ of the cosine wave component and the amplitude $\text{Im}_{vd6th}$ of the sine wave component for the correction voltage Vdh. The lookup table 81A defines the relationship between input values and reference values. The input values include the absolute value of the q-axis current command value Iq*, the absolute value of the d-axis current command value Id*, and the absolute value of the rotation speed ω of the motor 21. The reference values include the amplitudes $\text{Re}_{vq6th}$, $\text{Re}_{vd6th}$ of the cosine wave component and the amplitudes $\text{Im}_{vq6th}$, $\text{Im}_{vd6th}$ of the sine wave component.

Figure 3:
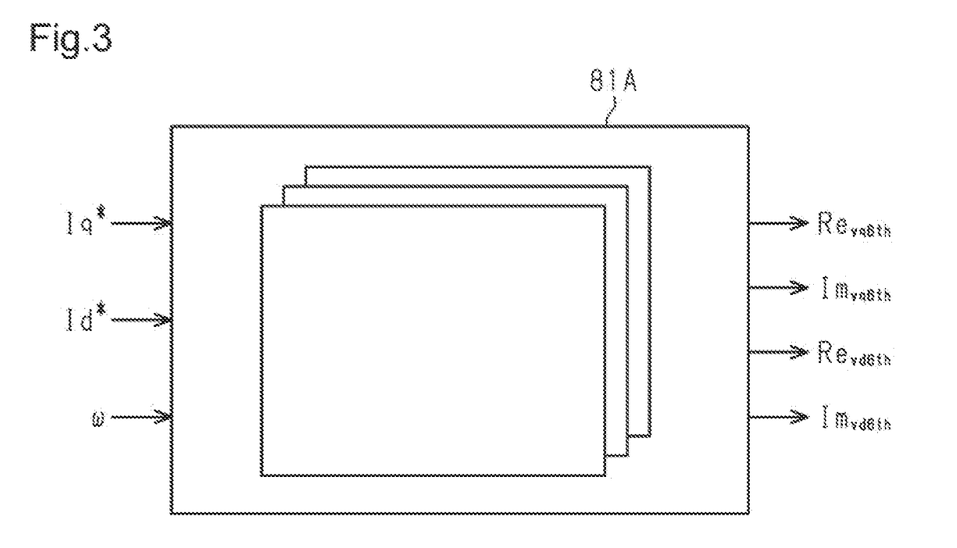
FIG. 3 is a block diagram illustrating a lookup table of the embodiment.

The lookup table 81A is set, for example, through simulation performed by a device model. That is, first, through the simulation, for each set of the values of the q-axis current command value Iq*, the d-axis current command value Id*, and the rotation speed ω of the motor 21, the values of the amplitudes $\text{Re}_{vq6th}$, $\text{Re}_{vd6th}$ of the cosine wave component and the amplitudes $\text{Im}_{vq6th}$, $\text{Im}_{vd6th}$ of the sine wave component are collected. Then, the value collected through the simulation is stored in a sequence to set the lookup table 81A.

As shown in FIG. 3, the lookup table 81A refers to the q-axis current command value Iq*, the d-axis current command value Id*, and the rotation speed ω of the motor 21 as input values. The lookup table 81A outputs, as the reference values, the amplitude $\text{Re}_{vq6th}$ of the cosine wave component and the amplitude $\text{Im}_{vq6th}$ of the sine wave component for the correction voltage Vqh and the amplitude $\text{Re}_{vd6th}$ of the cosine wave component and the amplitude $\text{Im}_{vd6th}$ of the sine wave component for the correction voltage Vdh, which correspond to the absolute values of the input values.

The compensation calculator 81 calculates the correction voltage Vqh by applying the amplitude $\text{Re}_{vq6th}$ of the cosine wave component and the amplitude $\text{Im}_{vq6th}$ of the sine wave component, which are obtained from the lookup table 81A, to the above equation (5). That is, the compensation calculator 81 synthesizes the correction voltage Vqh by adding together the real part ($\text{Re}_{vq6th} \cdot \cos 6\theta$), which is the cosine wave component, and the imaginary part ($\text{Im}_{vq6th} \cdot \sin 6\theta$), which is the sine wave component, at the same frequency. Further, the compensation calculator 81 calculates the correction voltage Vdh by applying the amplitude $\text{Re}_{vd6th}$ of the cosine wave component and the amplitude $\text{Im}_{vd6th}$ of the sine wave component, which are obtained from the lookup table 81A, to the above equation (6). That is, the compensation calculator 81 synthesizes the correction voltage Vdh by adding together the real part ($\text{Re}_{vd6th} \cdot \cos 6\theta$), which is the cosine wave component, and the imaginary part ($\text{Im}_{vd6th} \cdot \sin 6\theta$), which is the sine wave component, at the same frequency.

The adder 82 adds the correction voltage Vqh, which is calculated by the compensation calculator 81, to the q-axis voltage command value Vq*, which is calculated by the feedback controller 65, thereby calculating the final q-axis voltage command value Vqh*, which is used to control the motor 21. The final q-axis voltage command value Vqh* is expressed by the following equation (7).

$$Vqh^* = Vq^* + Vqh = Vq^* + \text{Re}_{vq6th} \cdot \cos 6\theta + \text{Im}_{vq6th} \cdot \sin 6\theta \qquad (7)$$

The adder 83 adds the correction voltage Vdh, which is calculated by the compensation calculator 81, to the d-axis voltage command value Vd ", which is calculated by the feedback controller 65, thereby calculating the final d-axis voltage command value Vdh", which is used to control the motor 21. The final d-axis voltage command value Vdh* is expressed by the following equation (8).

$$Vdh^* = Vd^* + Vdh = Vd^* + \text{Re}_{vd6th} \cdot \cos 6\theta + \text{Im}_{vd6th} \cdot \sin 6\theta \qquad (8)$$

The compensation calculator 81 refers to the lookup table 81A to obtain the amplitude $\text{Re}_{vq6th}$ of the cosine wave component and the amplitude $\text{Im}_{vq6th}$ of the sine wave component for the correction voltage Vqh and the amplitude $\text{Re}_{vq6th}$ of the cosine wave component and the amplitude $\text{Im}_{vd6th}$ of the sine wave component for the correction voltage Vdh. This reduces the calculation load on the compensation calculator 81. The compensation calculator 81 needs to refer to only a single lookup table 81A. Thus, as compared to when reference is made to multiple lookup tables, the reference load on the lookup table is reduced.

Advancement Control

In general, a phase lag occurs in the current in the motor coil. This is due to, for example, the inductance component of the motor coil, which is one reason why the current does not flow immediately even when a voltage is applied. Also, when the rotation speed ω of the motor 21 increases, the phase lag relatively occurs. Thus, in order to drive the motor 21 with a higher efficiency, the phase of applied voltage needs to be advanced in anticipation of the phase lag of the current in the motor coil. Thus, the control device 40 may have the following configuration.

As indicated by the long dashed double-short dashed line in FIG. 2, the microcomputer 51 includes an advancement controller 84. The advancement controller 84 calculates an advancement value as a compensation value used to compensate for the phase lag of the current in the motor coil. The advancement controller 84, for example, obtains the rotation angle θ of the motor 21, which is detected by the rotation angle sensor 43, and calculates the advancement value based on the rotation speed ω of the motor 21, which is obtained by differentiating the obtained rotation angle θ with respect to time. The advancement controller 84 uses the advancement value to correct the rotation angle θ of the motor 21. The advancement controller 84 calculates a final rotation angle θ used to control the motor 21 by, for example, adding the advancement value to the rotation angle θ of the motor 21, which is detected by the rotation angle sensor 43.

The three-phase-to-two-phase coordinate converter 64 performs three-phase-to-two-phase coordinate conversion using the corrected rotation angle θ, which is calculated by the advancement controller 84. Further, the two-phase-to-three-phase coordinate converter 66 performs two-phase-to-three-phase coordinate conversion using the corrected rotation angle θ, which is calculated by the advancement controller 84. As a result, according to the advancement value calculated by the advancement controller 84, advancement occurs in the phase of the voltage applied to the motor 21 (i.e., the phases of the three-phase voltage command values Vu*, Vv*, Vw*) and consequently in the phase of the current in the motor coil. The phase of induced voltage generated in the motor coil matches the phase of the current in the motor coil to compensate for the rotational lag of the motor 21 and improve the response performance of the motor 21.

The compensation calculator 81 uses the corrected rotation angle θ, which is calculated by the advancement controller 84, to calculate the correction voltage Vqh for the q-axis current command value Iq* and the correction voltage Vdh for the d-axis current command value Id*. In the present embodiment, the process related to compensation control for torque ripple executed by the compensation calculator 81 is an example of a compensation calculation process.

Advantages of Embodiment

The present embodiment has the following advantages.
(1) The correction voltage Vqh, which is a sine wave, is divided into the real part ($Re_{vq6th}$·cos 6θ), which is a cosine wave component, and the imaginary part ($Im_{vq6th}$·sin 6θ), which is a sine wave component, at the same frequency to simplify the calculation of the correction voltage Vqh. For example, if the amplitude $Re_{vq6th}$ of the cosine wave component and the amplitude $Im_{vq6th}$ of the sine wave component are known, the correction voltage Vqh, which is a sine wave that is in antiphase with torque ripple, can be identified using the rotation angle θ of the motor 21, which is detected by the rotation angle sensor 43. Further, the phase of the correction voltage Vqh does not have to be calculated. In the same manner as the correction voltage Vqh, the correction voltage Vdh is divided into the real part ($Re_{vd6th}$·cos 6θ), which is a cosine wave component, and the imaginary part ($Im_{vd6th}$·sin 6θ), which is a sine wave component, at the same frequency to simplify the calculation of the correction voltage Vdh. This reduces the calculation load. In such a manner, while the calculated correction voltage Vqh is applied to the q-axis voltage command value Vq*, the correction voltage Vdh is applied to the d-axis voltage command value Vd*. This limits the torque ripple of the motor 21.
(2) In the compensation control for the torque ripple, when the correction voltages Vqh, Vdh are respectively added to the q-axis voltage command value Vq* and the d-axis voltage command value Vd*, the calculation cycle of the microcomputer 51 is theoretically a cycle of superimposing the correction voltage on the voltage command value. This reduces the calculation load as compared with when a correction current is added to each of the q-axis current command value Iq* and the d-axis current command value Id*. This allows the microcomputer 51 to handle a high-frequency order component and handle a high-speed rotation of the motor 21 without setting the calculation cycle to a shorter time.
(3) By referring to a single lookup table 81A, the compensation calculator 81 immediately obtains the parameters ($Re_{vq6th}$, $Im_{vq6th}$, $Re_{vd6th}$, $Im_{vd6th}$) required to calculate the correction voltage Vqh. This reduces the calculation load on the compensation calculator 81.
(4) The compensation calculator 81 needs to refer to only a single lookup table 81A. Thus, as compared to when reference is made to multiple lookup tables, the reference load on the lookup table is reduced.
(5) When the advancement control is performed to compensate for the rotation delay in the motor 21, the compensation calculator 81 calculates the correction voltages Vqh, Vdh using the corrected rotation angle θ, which is calculated by the advancement controller 84, and the rotation speed ω, which is calculated based on the corrected rotation angle θ. The compensation calculator 81 uses the corrected rotation angle θ, which is the final rotation angle used to control the motor 21, to calculate more proper correction voltages Vqh, Vdh. Further, the compensation calculator 81 obtains the corrected rotation angle θ and the rotation speed ω that is based on the corrected rotation angle θ. This reduces the calculation load on the compensation calculator 81.
(6) Since the torque ripple of the motor 21 is limited, generation of vibration or noise is limited. Thus, the control device 40 is suitable for the electric power steering system 10, which requires quietness.

Modifications

The present embodiment may be modified as follows.
Depending on product specifications, the correction voltage Vqh may be added to only the q-axis voltage command value Vq to execute the compensation control for torque ripple. That is, the correction voltage Vdh does not have to be added to the d-axis voltage command value Vd*. This is because the torque generated by the three-phase motor 21 has a greater influence on the q-axis current value Iq than the d-axis current value Id.

The compensation control for torque ripple may reduce, for example, third or second harmonic components in the same manner as sixth harmonic components.

The lookup table 81A may be configured to output reference values corresponding to a positive input value and a negative input value. In this case, the input values include the q-axis current command value Iq*, the d-axis current command value Id*, and the rotation speed ω of the motor 21. The reference values include the amplitudes $Re_{vq6th}$, $Re_{vd6th}$ of the cosine wave component and the amplitudes $Im_{vq6th}$, $Im_{vd6th}$ of the sine wave component. This modification obtains advantages similar to advantages (3) and (4) of the above embodiment.

The lookup table 81A may include multiple tables. For example, the multiple tables simply need to include a table to be referred to when the q-axis current command value Iq*, the d-axis current command value Id*, and the rotation speed ω of the motor 21 all have a positive value and a table to be referred to when the q-axis current command value Iq*, the d-axis current command value Id*, and the rotation speed ω of the motor 21 all have a negative value. For example, the number of the tables simply needs to correspond to a combination of positive and negative values of the q-axis current command value Iq*, the d-axis current command value Id*, and the rotation speed ω of the motor 21.

The number of poles and the number of slots of the motor 21 are changed in accordance with the product specification. For example, the number of poles of the motor 21 may be ten, and the number of slots may be twelve. This reduces, for example, second harmonic components in the same manner as sixth harmonic components.

The motor 21 may be an inter permanent magnet (IPM) motor. The IPM motor is a motor with embedded magnets. In the rotor of the IPM motor, permanent magnets are embedded, serving as the source of magnetic flux.

The control device 40 may be arranged integrally with the motor 21. The control device 40 is arranged, for example, on an axial end of the motor 21.

The control device 40 may be employed in an electric power steering system that applies an assist force to the steering shaft 13. In this case, as shown by the long dashed double-short dashed line in FIG. 1, the motor 21 is coupled to the steering shaft 13 by a transmission mechanism such as a worm speed reducer.

The control device 40 may be used as a control device for a steer-by-wire system in which the power transmission path between the steering wheel 11 and the steerable wheels 12, 12 is mechanically cut off or can be mechanically cut off. Such a steer-by-wire system includes, for example, a system that is deployed to an autonomous driving system. The control device 40 is suitable as a control device for a reaction force motor that generates a steering reaction force applied to the steering wheel 11 or for a steering motor that generates a steering force, which is the power for steering the steerable wheels 12, 12.

The invention claimed is:

1. A motor control device that calculates a voltage command value for an inverter by executing feedback control that causes a current value of a three-phase motor to follow a current command value for the motor, the inverter controlling current supplied to the motor, the motor control device comprising:
    a compensation calculator configured to calculate, using a rotation angle of the motor detected by a sensor, a correction voltage added to the voltage command value to compensate for torque ripple of the motor, wherein
    the correction voltage is a sine wave that is in antiphase with the torque ripple, and is obtained by adding together a real part that is a cosine wave component and an imaginary part that is a sine wave component, the cosine wave component and the sine wave component having the same frequency, and
    the compensation calculator is configured to calculate an amplitude of the cosine wave component and an amplitude of the sine wave component from the current command value and a rotation speed of the motor.

2. The motor control device according to claim 1, wherein
    the compensation calculator is configured to calculate the amplitude of the cosine wave component and the amplitude of the sine wave component with reference to a single lookup table,
    the lookup table defines a relationship between an input value and a reference value,
    the input value includes the current command value and the rotation speed of the motor, and
    the reference value includes the amplitude of the cosine wave component and the amplitude of the sine wave component.

3. The motor control device according to claim 1, wherein
    the current command value includes a d-axis current command value and a q-axis current command value in a dq-axis coordinate system,
    the voltage command value includes a d-axis voltage command value and a q-axis voltage command value that are calculated by executing feedback control that causes a d-axis current value and a q-axis current value to respectively follow the d-axis current command value and the q-axis current command value,
    the d-axis current value and the q-axis current value are obtained through coordinate conversion of three-phase current values of the motor into two-phase current values in the dq-axis coordinate system, and
    the compensation calculator is configured to calculate the correction voltage for each of the q-axis voltage command value and the d-axis voltage command value based on the d-axis current command value, the q-axis current command value, and the rotation speed of the motor.

4. The motor control device according to claim 1, comprising an advancement controller configured to correct the rotation angle of the motor detected by the sensor, based on the rotation speed of the motor, to compensate for a phase lag of current in a motor coil, wherein
    the compensation calculator is configured to calculate the correction voltage using the rotation angle of the motor subsequent to being corrected by the advancement controller.

5. The motor control device according to claim 1, wherein the motor is configured to generate a driving force applied to a steering wheel of a vehicle.

6. A motor control method, comprising:
    calculating a voltage command value for an inverter by executing feedback control that causes a current value of a three-phase motor to follow a current command value for the motor, the inverter controlling current supplied to the motor;
    executing a compensation calculation process that calculates, using a rotation angle of the motor detected by a sensor, a correction voltage added to the voltage command value to compensate for torque ripple of the motor, wherein
    the correction voltage is a sine wave that is in antiphase with the torque ripple, and is obtained by adding together a real part that is a cosine wave component and an imaginary part that is a sine wave component, the cosine wave component and the sine wave component having the same frequency, and
    the compensation calculation process includes a process that calculates an amplitude of the cosine wave component and an amplitude of the sine wave component from the current command value and a rotation speed of the motor.

* * * * *